United States Patent [19]

Dearnaley et al.

[11] Patent Number: 5,594,041
[45] Date of Patent: Jan. 14, 1997

[54] METHODS FOR INCREASING STRUCTURAL INTEGRITY OF POLYMERS AND POLYMERS TREATED BY SUCH METHODS

[75] Inventors: Geoffrey Dearnaley, San Antonio, Tex.; Leonard F. Herk, Jr., Bridgeport, Mich.

[73] Assignee: Southwest Research Institute, San Antonio, Tex.

[21] Appl. No.: 484,186

[22] Filed: Jun. 7, 1995

[51] Int. Cl.$^6$ ........................................ C08F 2/46
[52] U.S. Cl. ................... 522/2; 522/3; 522/113; 522/134
[58] Field of Search ................... 522/2, 3, 113, 522/134

[56] References Cited

U.S. PATENT DOCUMENTS 3,154,479 10/1964 Muroi et al. .
3,188,165 6/1965 Magat et al. .
3,892,575 7/1975 Watts et al. .
4,155,823 5/1979 Gotcher et al. .................. 522/117
5,051,312 9/1991 Allmer ............................... 428/458

*Primary Examiner*—Mark Chapman
*Attorney, Agent, or Firm*—Madan & Morris, PLLC

[57] ABSTRACT

The present invention provides a method for improving the structural integrity of polymers using a combination of high energy radiation and improved crosslinking agents. The crosslinking agents are 1,3-butadiene, three carbon cyclic compounds, three membered heterocyclic organic compounds, or linear analogues of three carbon cyclic compounds and three membered heterocyclic organic compounds, which are compact enough to diffuse to a suitable depth within the polymeric network. Preferred cyclic crosslinking agents are cyclopropane and ethylene oxide. Preferred linear crosslinking agents include propylene, 1,3-butadiene, dimethyl ether, and propane. A preferred form of high energy radiation is a beam of energetic low mass ions.

38 Claims, No Drawings

METHODS FOR INCREASING STRUCTURAL INTEGRITY OF POLYMERS AND POLYMERS TREATED BY SUCH METHODS

FIELD OF THE INVENTION

The present invention relates to in-depth crosslinking of polymeric materials. More particularly, the invention relates to the combined use of improved crosslinking agents and high energy charged particle irradiation to increase the structural integrity of polymers, thereby decreasing their solubility and permeability and increasing their resistance to mechanical fatigue and adhesive wear.

BACKGROUND OF THE INVENTION

Polymers are used today in the manufacture of a multitude of products. Their diversity, desirable qualities, and low cost make them excellent substitutes for many natural materials. Unfortunately, due to their open molecular structure and low density, polymers have relatively low cohesion and structural integrity. As a result, polymer molecules are easily pulled out of the polymer during adhesive wear, and the polymer tends to be highly permeable to small molecules, such as oxygen, water, methanol, and lower molecular weight hydrocarbons.

Many applications do not require polymers with high levels of mechanical strength comparable to metals, for example. However, polymers are used in an increasing number of applications that do require elevated levels of mechanical and chemical integrity. An excellent example of such an application is the use of ultra high molecular weight polyethylene to form the "bearing" in a total hip joint replacement.

One way to increase the durability of UHMWPE would be to increase the number of crosslinks between the chains in the polymer. Increased bonding or crosslinking in polymers, generally, should increase the hardness, fracture resistance, softening temperature, and abrasive or adhesive wear resistance of the polymer, and reduce polymer solubility and permeability to small molecules.

The foregoing property enhancements would render polymers more useful in a variety of settings. For example, reduced permeability is important for polymer films, such as nylon and polyethylene terephthalate (PET).

Increasing the hardness, wear resistance, and thermal stability of polymers would be useful in expanding their use for lightweight engine components and plastic window glass coatings in the automotive industry. Nylon and polyethylene terephthalate (PET) are examples of materials that might be suitable for such uses if these properties were enhanced.

Enhancing these properties also would permit more widespread use of low cost polymeric molds for short run, plastic injection molding. Because the polymeric molds, themselves, could be molded, the polymeric molds would be cheaper to make than conventional steel molds.

A method for efficiently and effectively improving the structural integrity and hardness of polymers for select wear surfaces of molded components also would be highly desirable.

SUMMARY OF THE INVENTION

The present invention provides a method for improving the structural integrity of polymers using a combination of high energy charged particle radiation and improved crosslinking agents.

DETAILED DESCRIPTION OF THE INVENTION

Substantially any organic polymer may be treated according to the present invention. Suitable polymers include, but are not limited to, polyethylene, including high density polyethylene ("HDPE"), ultra high molecular weight polyethylene ("UHMWPE"), nylon, polyethylene terephthalate (PET), polymethylmethacrylate (PMMA), and polycarbonates. In a preferred embodiment, the polymer substrate is a non-crosslinked thermoplastic material.

Where the desired result is a decrease in permeability of the polymer, preferred polymers are nylon, HDPE, and PET. Where the desired result is an increase in abrasion resistance of the polymer, preferred polymers are PET, UHMWPE, PMMA, and polycarbonates.

The crosslinking agents are three carbon cyclic compounds, three membered heterocyclic organic compounds, or their linear analogues, which are compact enough to diffuse to a suitable depth within the polymeric network. Without limiting the present invention to any particular mechanism of action, it is believed that the crosslinking agents of the present invention operate as follows.

After the crosslinking agent is diffused into the polymer, high energy charged particle irradiation and secondary reactions are believed to form ions or free radicals on neighboring polymer chains, and either (a) substantially simultaneously open any three carbon cyclic compounds or three membered heterocyclic organic crosslinking agents that lie in the same area, or (b) activate analogous linear compounds lying in the same area. The newly opened organic rings, or their activated linear analogues, chemically react with the ions or free radicals on neighboring chains of the polymer, and, in general are long enough to bridge the gap between neighboring polymeric free radicals.

Substantially any three carbon cyclic or three membered heterocyclic organic compound, or its linear analogue, should work in the present invention as long as the crosslinking agent: (a) is compatible with the polymeric substrate; (b) is compact enough to diffuse to a sufficient depth within the polymeric network; (c) opens, or is activated, upon exposure to high energy charged particle irradiation; (d) chemically reacts with the ions or free radicals on nearby adjacent polymeric chains; and, (e) is generally long enough after opening or activation to bridge the gap between polymer chains.

The crosslinking agents of the present invention are represented generally by the following formulas:

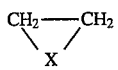

wherein X is selected from the group consisting of methylene, imine, and oxygen;

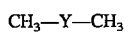

wherein Y is selected from the group consisting of alkylene groups having between 1–2 carbon atoms, imine, oxygen, and sulfur; and

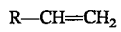

wherein R is selected from the group consisting of vinyl, methyl, amine, and acetylene.

In each of the foregoing formulas, the hydrogens may be replaced by a substituent that is independently selected from the group consisting of F, CH₃ (methyl), CH=CH₂ (vinyl), C≡N (cyano), OH (hydroxyl), SH (mercapto), and NH₂ (amino). More than one hydrogen on each carbon can be replaced with the listed substituents; however, the efficacy of the resulting compound as a crosslinking agent will decrease as the number of substituted hydrogens increases. The efficacy can be expected to decrease either because the resulting molecule will be larger—and thus will not diffuse into the polymer as easily—or because the bond between the carbon and the substituent will be harder to break than the bond between carbon and hydrogen. Preferably, the number of hydrogens replaced by such substituents should be minimized. In a preferred embodiment, no more than one of the hydrogens is replaced by such a substituent. In a most preferred embodiment, none of the hydrogens is replaced by such a substituent.

Examples of suitable crosslinking agents include, but are not limited to, cyclopropane, ethylene oxide, ethylene imine, dimethyl ether, dimethyl amine, dimethyl sulfide, propylene, and 1,3-butadiene. Preferred cyclic crosslinking agents are cyclopropane and ethylene oxide. Preferred linear crosslinking agents include propylene, 1,3-butadiene, dimethyl ether, and propane. A cross-linking agent that should work in the present invention—particularly for polar polymers, such as nylon or PMMA—but might be too toxic for many uses, is cyanogen, N≡C—C≡N.

The crosslinking agents of the present invention are commercially available from a number of sources. For example, cyclopropane, ethylene oxide, and 1,3-butadiene may be obtained from Scott Specialty Gases of Houston, Tex., among other locations.

A preferred form of high energy charged particle irradiation is a beam of energetic low mass ions. The combination of cross-linking agents and high energy ion beam irradiation is more effective than the use of ion beam irradiation alone, and reduces the amount of irradiation needed to form a crosslinked matrix on the surface of the polymer. This reduction in the required level of irradiation has economic advantages, and will cause less scission of the original polymer chains. Less chain scission is desirable in order to avoid changing the properties of the polymer and reducing the polymer's long term integrity.

In a preferred embodiment, the polymeric component should be cleaned using conventional cleaning procedures to remove superficial contaminants, such as grease. If desired, adsorbed atoms may be removed by placing the component in a vacuum and bombarding the component with argon at an energy between about 10–100 kev, preferably about 10 keV.

The component preferably should be pretreated with the crosslinking agent so that the crosslinking agent can diffuse into the polymer to a sufficient depth within the polymeric network. In a preferred embodiment, the polymer should be placed in a pressure/vacuum chamber and exposed to the selected crosslinking agent in gaseous form. The depth of diffusion of the crosslinking agent can be controlled to some extent through pressure, temperature, and length of time of exposure to the gaseous crosslinking agent.

A preferred embodiment involves the diffusion of between about 1–5% by weight of a cyclic crosslinking agent in the polymer surface layer having a maximum depth of about 10 microns ($10^{-2}$ mm). The parameters required to accomplish this result will vary with the polymer, the particular crosslinking agent, and the particular type of irradiation. The crosslinking agent will only diffuse into the near surface of the polymer; therefore, the total weight gain of the polymer will be negligible, i.e., 0.01% or less of the total mass.

For example, where nylon 66 film is the polymer and cyclopropane is the cross-linking agent, the desired level of diffusion can be attained by first degassing the film in a vacuum chamber for at least about 10 minutes at 20° C. (68° F.), and then exposing the film to about 5 atmospheres (75 psig or 5273 gm/cm²) cyclopropane gas for one hour. The polymeric film should be withdrawn from the high pressure cyclopropane atmosphere and cooled to about −20° C. (−4° F.) in an atmosphere of about 0 psig (0 gm/cm²). Persons of ordinary skill in the art will recognize how to adjust these parameters based upon the vapor pressure-temperature relationships of the various crosslinking agents to achieve a desired level of diffusion.

Once a sufficient volume of crosslinking agent is diffused into the polymer, the polymer should be promptly irradiated. When the pretreated polymer is exposed to high energy charged particle irradiation, one of the following reactions should occur. Reactions A, B, and C refer to polymeric segments, are given for illustration only, and should not be considered to limit the present invention to any particular mechanism of action:

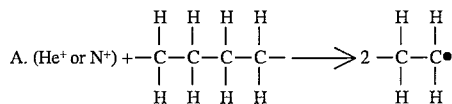

When "A" occurs, the most likely result will be for the two free radical chains to recombine. This is true because the recombination reaction is much faster than the time required for the two free radical segments to diffuse apart. This recombination is predominant even for much smaller radical pairs formed in liquid media where the free radical chains are much freer to separate.

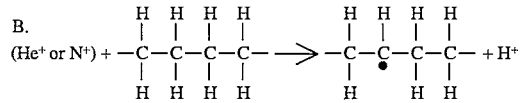

Reaction "B" results in the formation of a free radical—which becomes a candidate for crosslinking—and a hydrogen atom. The free radical can recombine with the free hydrogen atom; however, the hydrogen atom will be in a high energy state as a result of the ion collision, and thus will be very mobile within the polymeric matrix. As a result, the hydrogen atom can distance itself from the carbon free radical very quickly. A more highly favored secondary reaction for the hydrogen atom would be to abstract a hydrogen from a neighboring molecule to form H₂ as follows:

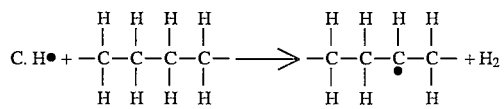

The resulting hydrogen molecule is very stable and mobile, and eventually will diffuse out of the polymer. The more important result of this secondary reaction is that another polymeric free radical is formed in the proximity of the free radical formed in "A". However, the two free radicals could have a problem connecting because of the relative lack of mobility of the polymeric chains and their relatively large separation.

The use of cyclic bridging compounds, such as cyclopropane, ethylene oxide, etc.. may result in the following reactions:

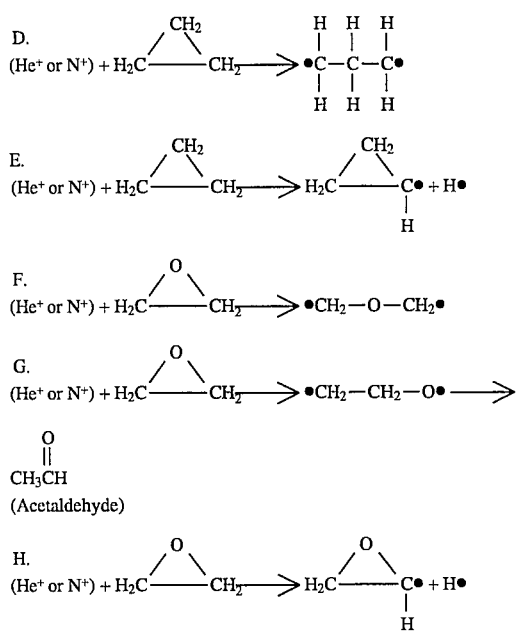

Reactions "D" and "F" produce biradicals of the proper length to bridge the gap between two polymer chains. These biradicals also are capable of bonding to those chains at points where the chains already possess a free radical carbon atom. Such bonding is favored by the fact that energetic $He^+$ or $N^+$ ions will break as many as 50 chemical bonds as they plunge into a polymer and before their energy is dissipated. The broken chemical bonds will lie along the path of the high energy ion.

Reactions "E" and "H" are not very helpful because the cyclic free radicals either will abstract a hydrogen or add to another free radical. In any case, the cyclic free radicals do not open to form a crosslink. To the extent possible, reaction "G," which produces acetaldehyde, should be avoided because that reaction leaves a polar and somewhat reactive molecular species embedded in the polymer matrix.

Reaction "I" should occur when 1,3-butadiene is used as a cross-linking agent.

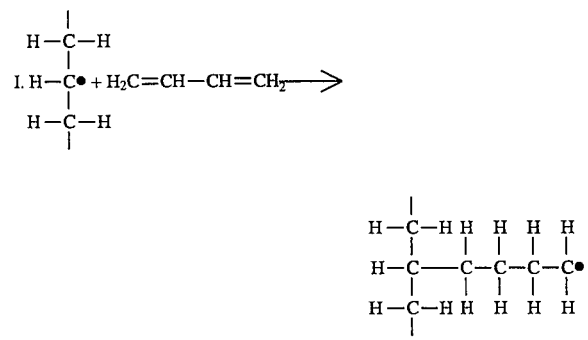

To crosslink polymer by this method, the polymer generally should be precooled to about −20° C. (−4° F.) and subjected to a vacuum of about $10^{-6}$ to $10^{-4}$ torr, preferably about $10^{-5}$ torr. The crosslinking agent then should be introduced, preferably in gaseous form. As an example, when cyclopropane is the crosslinking agent, undiluted cyclopropane gas should be introduced into the chamber housing the test component, and the pressure and temperature should be maintained in the chamber for a period of between about 0.2 to 2.0 hours.

The temperature at which the polymer is subjected to the crosslinking agent may vary depending upon the volatility of the crosslinking agent and the thermal stability of the particular polymer. Similarly, the pressure in the chamber also may vary, primarily dependent upon the vapor pressure of the particular crosslinking agent. In general, the maximum pressure (atmospheres absolute) should be roughly ⅔ the vapor pressure for the gas at the temperature of operation. Table I reflects some maximum soak pressures for crosslinking agents at 20° C. and 50° C.

TABLE I

| CROSSLINKING AGENT | SOAK PRESSURE (ATMOSPHERES ABSOLUTE) @ 20° C. | SOAK PRESSURE (ATMOSPHERES ABSOLUTE) @ 50° C. |
| --- | --- | --- |
| Propylene | 7 | — |
| Cyclopropane | 5 | — |
| Ethylene Oxide | 1 | 2 |
| 1,3-Butadiene | 1.5 | 4 |
| Vinylacetylene | 1 | 3 |
| Propane | 6 | — |
| Dimethyl Ether | 3 | — |
| Butane | 1.5 | 4 |
| Dimethyl Amine | 1 | 3 |
| Dimethyl Sulfide | — | 1 |

If 20° C. is the operating temperature, then the most promising crosslinking agents, in order of preference, are cyclopropane, propylene, propane, and dimethyl ether. If the crosslinking agent is 1,3-butadiene, then the temperature should be slightly higher to allow for the use of at least 2–3 atmospheres of pressure to diffuse the 1,3-butadiene into the polymer. As a general rule, the pressure in the chamber should be increased to between about 1–7 atmospheres absolute and the temperature should be increased to between about 20°–50° C. (68°–122° F.).

The polymer then should be irradiated in situ, or transferred to a chamber where it can be irradiated, either in a continuous or interrupted fashion, with an energetic beam of ions. In order to maximize simultaneous alkyl radical formation and ring opening (where a cyclic crosslinking agent is used), the high energy charged particle irradiation used in the process should have a relatively high linear energy transfer (LET). LET is the energy deposited per unit distance along the path of a particle of high energy charged particle irradiation. In order to achieve a high LET, the high energy charged particle irradiation should comprise: (a) energetic protons or other neon, or argon, at an energy between about 10 keV and 100 keV; or, (b) electrons at an energy between about 1 keV and 50 keV. A preferred embodiment uses the low-mass ion species, such as protons, at an energy between about 10 keV and 100 keV, preferably about 30 keV. If a more shallow surface treatment is desired—for example, when the substrate is a thin film—an energy of about 8 keV or lower should suffice. Alternately, the polymer can be irradiated with a beam of electrons at an energy between about 1 keV and 50 keV, preferably at an energy of about 3 keV.

The rate of arrival of ions should be between about $10^{12}$–$10^{16}$ ions/cm$^2$/sec, preferably between about $10^{13}$–$10^{15}$ ions/cm$^2$/sec. During the irradiation, the components may be manipulated in order to provide the maximum degree of uniformity of irradiation over their surfaces. The ion bombardment should be continued until a sufficient number of crosslinks have formed to increase the structural integrity of the polymer to a desired level—typically about one minute.

Persons of skill in the art will appreciate that many modifications may be made to the embodiments described herein without departing from the spirit of the present invention. Accordingly, the embodiments described herein are illustrative only and are not intended to limit the scope of the present invention.

We claim:

1. A method for increasing the structural integrity of an organic polymer comprising the steps of:

diffusing into one or more selected surface of an organic polymer a crosslinking agent selected from the group consisting of three carbon cyclic compounds, three membered heterocyclic organic rings, linear organic analogues of three carbon cyclic and three membered heterocyclic organic rings, and 1,3-butadiene; and exposing said organic polymer and said crosslinking agent to high energy charged particle irradiation in a vacuum at a linear energy of transfer, a rate of ion arrival, and for a time sufficient to induce a desired amount of crosslinking to a desired depth within said polymer.

2. The method of claim 1 wherein said rate of ion arrival is between about $10^{12}$ to $10^{16}$ ions/cm²/sec.

3. The method of claim 2 wherein said crosslinking agent comprises a compound having the formula:

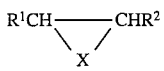

wherein X is selected from the group consisting of a methylene group, an imine group, and oxygen; and wherein $R^1$ and $R^2$ independently are selected from the group consisting of H, F, and methyl, vinyl, cyano, hydroxyl, mercapto, and amino groups.

4. The method of claim 3 wherein said diffusion step comprises exposing said polymer to said crosslinking agent in gaseous form at a pressure between about 1–5 atmospheres absolute and a temperature between about 20°–60° C. (68°–140° F.).

5. The method of claim 2 wherein said crosslinking agent comprises a compound having the formula:

$$R^1CH_2—Y—CH_2R^2$$

wherein Y is selected from the group consisting of alkylene groups having between 1–2 carbon atoms, an imine group, oxygen, and sulfur; and wherein $R^1$ and $R^2$ independently are selected from the group consisting of H, F, and methyl, vinyl, cyano, hydroxyl, mercapto, and amino groups.

6. The method of claim 5 wherein said diffusion step comprises exposing said polymer to said chain linking agent in gaseous form at a pressure between about 1–6 atmospheres absolute and a temperature between about 20°–60° C. (68°–140° F.).

7. The method of claim 2 wherein said crosslinking agent comprises a compound having the formula:

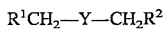

wherein $R_1$ is selected from the group consisting of vinyl, methyl, amine, and acetylene groups;

wherein $R^2$ and $R^3$ independently are selected from the group consisting of H, F, and methyl, vinyl, cyano, hydroxyl, a mercapto, and amino groups.

8. The method of claim 7 wherein said diffusion step comprises exposing said polymer to said chain linking agent in gaseous form at a pressure between about 1.5–7 atmospheres absolute and a temperature between about 20°–60° C. (68°–140° F.).

9. The method of claim 2 wherein said crosslinking agent is selected from the group consisting of cyclopropane, ethylene oxide, ethylene imine, dimethyl ether, dimethyl amine, dimethyl sulfide, propylene, and 1,3-butadiene.

10. The method of claim 9 wherein said diffusion step comprises exposing said polymer to said chain linking agent in gaseous form at a pressure between about 1–7 atmospheres absolute and a temperature between about 20°–60° C. (68°–140° F.).

11. The method of claim 2 wherein said diffusion step comprises exposing said polymer to said crosslinking agent in gaseous form at a pressure between about 1–7 atmospheres absolute and a temperature between about 20°–60° C. (68°–140° F.).

12. The method of claim 11 wherein said polymer is a non-crosslinked thermoplastic material.

13. The method of claim 11 wherein said polymer is selected from the group consisting of polyethylene, high density polyethylene, ultra high molecular weight polyethylene, nylon, polyethylene terephthalate, polymethylmethacrylate, and polycarbonate.

14. The method of claim 2 wherein said polymer is a non-crosslinked thermoplastic material.

15. The method of claim 2 wherein said polymer is selected from the group consisting of polyethylene, high density polyethylene, ultra high molecular weight polyethylene, nylon, polyethylene terephthalate, polymethylmethacrylate, and polycarbonate.

16. The method of claim 2 wherein said high energy charged particle irradiation is selected from the group consisting of a beam of low mass ion species selected from the group consisting of helium, methane, nitrogen, oxygen, neon, argon, and mixtures thereof; and a beam of electrons at an energy between about 1–50 keV.

17. The method of claim 1 wherein said crosslinking agent comprises a compound having the formula:

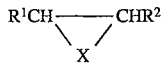

wherein X is selected from the group consisting of oxygen, a methylene group, and an imine group; and wherein $R^1$ and $R^2$ independently are selected from the group consisting of H, F, and methyl, vinyl, cyano, hydroxyl, mercapto, and amino groups.

18. The method of claim 17 wherein said diffusion step comprises exposing said polymer to said crosslinking agent in gaseous form at a pressure between about 1–5 atmospheres absolute and a temperature between about 20°–60° C. (68°–140° F.).

19. The method of claim 1 wherein said crosslinking agent comprises a compound having the formula:

$$R^1CH_2—Y—CH_2R^2$$

wherein Y is selected from the group consisting of alkylene groups having between 1–2 carbon atoms, an imine group, oxygen, and sulfur; and wherein $R^1$ and $R^2$ independently are selected from the group consisting of H, F, and methyl, vinyl, cyano, hydroxyl, mercapto, and amino groups.

20. The method of claim 19 wherein said diffusion step comprises exposing said polymer to said crosslinking agent in gaseous form at a pressure between about 1–6 atmospheres absolute and a temperature between about 20°–60° C. (68°–140° F.).

21. The method of claim 1 wherein said crosslinking agent comprises a compound having the formula:

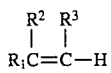

wherein $R_1$ is selected from the group consisting of vinyl, methyl, amine, and acetylene groups;
wherein $R^2$ and $R^3$ independently are selected from the group consisting of H, F, and methyl, vinyl, cyano, hydroxyl, mercapto, and amino groups.

22. The method of claim 21 wherein said diffusion step comprises exposing said polymer to said chain linking agent in gaseous form at a pressure between about 1.5–7 atmospheres absolute and a temperature between about 20°–60° C. (68°–140° F.).

23. The method of claim 1 wherein said crosslinking agent is selected from the group consisting of cyclopropane, ethylene oxide, ethylene imine, dimethyl ether, dimethyl amine, dimethyl sulfide, propylene, and 1,3-butadiene.

24. The method of claim 23 wherein said diffusion step comprises exposing said polymer to said crosslinking agent in gaseous form at a pressure between about 1–7 atmospheres absolute and a temperature between about 20°–60° C. (68°–140° F.).

25. The method of claim 23 wherein said polymer is a non-crosslinked thermoplastic material.

26. The method of claim 23 wherein said polymer is selected from the group consisting of polyethylene, high density polyethylene, ultra high molecular weight polyethylene, nylon, polyethylene terephthalate, polymethylmethacrylate, and polycarbonate.

27. The method of claim 23 wherein said high energy charged particle irradiation is selected from the group consisting of
a beam of low mass ion species selected from the group consisting of helium, methane, nitrogen, oxygen, neon, argon, and mixtures thereof; and
a beam of electrons at an energy between about 1–50 keV.

28. The method of claim 1 wherein said diffusion step comprises exposing said polymer to said crosslinking agent in gaseous form at a pressure between about 1–7 atmospheres absolute and a temperature between about 20°–60° C. (68°–140° F.).

29. The method of claim 28 wherein said polymer is a non-crosslinked thermoplastic material.

30. The method of claim 28 wherein said polymer is selected from the group consisting of polyethylene, high density polyethylene, ultra high molecular weight polyethylene, nylon, polyethylene terephthalate, polymethylmethacrylate, and polycarbonate.

31. The method of claim 28 wherein said high energy charged particle irradiation is selected from the group consisting of
a beam of low mass ion species selected from the group consisting of helium, methane, nitrogen, oxygen, neon, argon, and mixtures thereof; and
a beam of electrons at an energy between about 1–50 keV.

32. The method of claim 1 wherein said polymer is a non-crosslinked thermoplastic material.

33. The method of claim 1 wherein said polymer is selected from the group consisting of polyethylene, high density polyethylene, ultra high molecular weight polyethylene, nylon, polyethylene terephthalate, polymethylmethacrylate, and polycarbonate.

34. The method of claim 1 wherein said high energy charged particle radiation is selected from the group consisting of
a beam of low mass ion species selected from the group consisting of helium, methane, nitrogen, oxygen, neon, argon, and mixtures thereof; and
a beam of electrons at an energy between about 1–50 keV.

35. A polymeric component with increased structural integrity resulting from diffusion of a crosslinking agent into the polymer and exposure to high energy charged particle irradiation comprising polymer chains having crosslinks with neighboring polymer chains, wherein said crosslinks are selected from the group consisting of 1,3-butadiene, linear analogues of three carbon cyclic compounds, and linear analogues of three membered heterocyclic organic rings.

36. A polymer having increased surface integrity produced by a process comprising the steps of:
diffusing into one or more selected surface of an organic polymer a crosslinking agent selected from the group consisting of three carbon cyclic compounds, three membered heterocyclic organic rings, linear organic analogues of three carbon cyclic compounds, linear analogues of three membered heterocyclic organic rings, and 1,3-butadiene; and
exposing said organic polymer and said crosslinking agent to high energy charged particle irradiation in a vacuum at a linear energy of transfer, a rate of ion arrival, and for a time sufficient to induce a desired amount of crosslinking to a desired depth within said polymer.

37. A method for decreasing the permeability of an organic polymer comprising the steps of:
selecting an organic polymer from the group consisting of nylon, high density polyethylene, and polyethylene terephthalate;
diffusing into one or more selected surface of said organic polymer a crosslinking agent selected from the group consisting of three carbon cyclic compounds, three membered heterocyclic organic rings, linear organic analogues of three carbon cyclic compounds, linear analogues of three membered heterocyclic organic rings, and 1,3-butadiene; and
exposing said organic polymer and said crosslinking agent to high energy charged particle irradiation in a vacuum at a linear energy of transfer, a rate of ion arrival, and for a time sufficient to induce a desired amount of crosslinking to a desired depth within said polymer.

38. A method for increasing the scratch resistance of an organic polymer comprising the steps of:
selecting an organic polymer from the group consisting of polyethylene terephthalate, ultra high molecular weight polyethylene, polymethylmethacrylate, and polycarbonate;
diffusing into one or more selected surface of said organic polymer a crosslinking agent selected from the group consisting of three carbon cyclic compounds, three membered heterocyclic organic rings, linear organic analogues of three carbon cyclic compounds, linear analogues of three membered heterocyclic organic rings, and 1,3-butadiene; and exposing said organic polymer and said crosslinking agent to high energy charged particle irradiation in a vacuum at a linear energy of transfer, a rate of ion arrival, and for a time sufficient to induce a desired amount of crosslinking to a desired depth within said polymer.

* * * * *